United States Patent
Duffy et al.

(10) Patent No.: US 6,563,294 B2
(45) Date of Patent: May 13, 2003

(54) SYSTEM AND METHOD FOR HIGHLY PHASED POWER REGULATION

(75) Inventors: Thomas P. Duffy, Chandler, AZ (US); Ryan Goodfellow, Mesa, AZ (US); David Susak, Phoenix, AZ (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/112,738

(22) Filed: Apr. 1, 2002

(65) Prior Publication Data

US 2002/0118001 A1 Aug. 29, 2002

Related U.S. Application Data

(63) Continuation of application No. 09/975,195, filed on Oct. 10, 2001.
(60) Provisional application No. 60/238,993, filed on Oct. 10, 2000, provisional application No. 60/239,049, filed on Oct. 10, 2000, and provisional application No. 60/239,166, filed on Oct. 10, 2000.

(51) Int. Cl.[7] .............................................. G05F 1/40
(52) U.S. Cl. ...................................................... 323/283
(58) Field of Search ................................ 323/265, 266, 323/268, 269, 271, 282, 283, 285

(56) References Cited

U.S. PATENT DOCUMENTS

| 4,975,820 | A | | 12/1990 | Szepesi |
| 5,847,950 | A | | 12/1998 | Bhagwat |
| 5,903,452 | A | | 5/1999 | Yang |
| 5,936,520 | A | * | 8/1999 | Luitje et al. ................ 340/517 |
| 5,969,513 | A | | 10/1999 | Clark |
| 6,020,729 | A | | 2/2000 | Stratakos et al. |
| 6,031,743 | A | | 2/2000 | Carpenter |
| 6,043,810 | A | * | 3/2000 | Kim et al. .................. 345/173 |
| 6,100,676 | A | | 8/2000 | Burstein et al. |
| 6,160,441 | A | | 12/2000 | Stratakos et al. |
| 6,031,361 | A1 | | 2/2001 | Burstein et al. |
| 6,198,261 | B1 | | 3/2001 | Schultz et al. |
| 6,225,795 | B1 | | 5/2001 | Stratakos et al. |
| 6,628,716 | | | 7/2001 | Burstein et al. |
| 6,412,076 | B1 | * | 6/2002 | Honda et al. ............... 713/323 |

OTHER PUBLICATIONS

Digital PWM Control: Application in VoltageRegulation Modules, Wu/Xiao/Markovic/Sanders 1999 IEEE.
Reliability Improvement in Parallel Connected Converter Systems, Wu/Siri/Lee 1991 IEEE.

* cited by examiner

Primary Examiner—Matthew Nguyen
(74) Attorney, Agent, or Firm—Snell & Wilmer L.L.P.

(57) ABSTRACT

A highly phased power regulation (converter) system having an improved control feature is provided. A controller, such as a digital signal processor or microprocessor, receives digital information from a plurality of power conversion blocks and transmits control commands in response to the information. The controller is able to change the mode of operation of the system and/or re-phase the power blocks to accommodate a dynamic load requirement, occasions of high transient response or detection of a fault. In one embodiment, a microprocessor receives digital information and converted power from one or more power blocks. In this manner, the microprocessor is able to receive feedback on its own operation. The controller is also able to anticipate and predict conditions by analyzing precursor data. In this manner, the controller is able to modify the system as needed in anticipation of the forthcoming event.

26 Claims, 5 Drawing Sheets

SYSTEM AND METHOD FOR HIGHLY PHASED POWER REGULATION

CROSS REFERENCE TO RELATED APPLICATIONS

This application is a continuation of U.S. Ser. No. 09/975,195, filed on Oct. 10, 2001, the disclosure of which is hereby incorporated by reference.

This application includes subject matter that is related to and claims priority from the following U.S. Provisional Patent Applications filed on Oct. 10, 2000: Ser. No. 60/238,993 entitled, "Multi Output Switching Power Converter with Optical I/O Microprocessor Control;" Ser. No. 60/239,049 entitled, "Multi Output Synchronous Power Conversion with DSP Control;" and Ser. No. 60/239,166 entitled, "Highly Phased Switching Regulator with DSP Control."

FIELD OF INVENTION

The present invention relates generally to power regulation systems and, in particular, to a highly phased power regulation system and, more particularly to an improved control system for highly phased power regulation systems.

BACKGROUND OF THE INVENTION

Switching power converters (SPCs) are used to regulate the input voltage to a load. Often times, voltages are initially not suitable for a particular load (e.g., high AC) and must be downscaled (i.e., to a lower voltage) and/or converted (i.e., AC to DC rectified voltage) before applying to the load. In general, conventional SPC systems adequately provide voltage regulation to a load, however, there are drawbacks.

Traditional converter control methods are typically locked into one or two modes of operation (e.g., Pulse Width Modulation (PWM), constant ON time variable frequency, constant ON or OFF time and variable frequency, simultaneous phases ON, and simultaneous phases OFF). Depending on the particular load demands, utilizing one mode over another may improve control of the output voltage. Thus, a single operational mode converter typically cannot efficiently accommodate power delivery to complex or dynamic load requirements.

It is common to couple more than one load to a power regulation system. In these multi-load/multi-output configurations, SPCs have traditionally required a separate controller or transformer with post regulators for each of the outputs. Each control unit requires compensating elements and support components which substantially increases the parts count for the converter. Additionally, in multi-output systems it is often desirable to include time synchronization to produce multi-phased outputs. These complex systems require precise management and control which, in general, the traditional purely analog converter systems cannot adequately manage. While transformers have shown some success in multi-output power conversion, these systems again typically require multiple controllers.

With the advent of increasingly complex power regulation topologies, more precise control of the switching elements (i.e. synchronous rectifiers) and better control methods have been attempted. Digital techniques for power converter control, specifically in multiphase designs, can improve precision and reduce the system's parts count. Digital control can also be upgraded for different applications of the same power system, e.g., for programmable feedback control.

Microprocessor loads vary greatly in current and generally require a high di/dt load transient current. For these applications, the power conversion system must be able to sense the current or voltage droop in order to correct for the load demand. Current sensing of the load is difficult and typically requires bulky, lossy and inaccurate methods. Voltage sensing has the disadvantage of lagging the current in the load. Delays in both methods can lead to inadequate response of the SPC.

Accordingly, an improved power regulation system is needed. In particular, a highly phased power regulation system having multi-mode capabilities over one or more loads is desired. More particularly, a versatile and adaptable power conversion and regulation system having an improved control feature is desired.

SUMMARY OF THE INVENTION

The present invention overcomes the problems outlined above and provides an improved power regulation system. In particular, the present invention provides a power regulation system (power converter) with an improved control feature. More particularly, the system and methods of the present invention allow for independent control of one or more outputs from a single controlling unit.

A power regulation system of the present invention includes a plurality of power conversion blocks in a multi-phased configuration, a controller, and a communication channel coupled there-between. Digital information is received at the controller from the power blocks and commands are transmitted in response. In this manner, the controller may anticipate and predict forthcoming conditions and "set" the system into a predictive mode accordingly.

In one particular embodiment of the present invention, a microprocessor receives digital information a plurality of power ICs and converted power from at least one of the power ICs. In this manner, the microprocessor is able to receive feedback on its own operation and adjust the system accordingly.

BRIEF DESCRIPTION OF THE DRAWINGS

These and other features, aspects and advantages of the present invention will become better understood with reference to the following description, appending claims, and accompanying drawings where:

DETAILED DESCRIPTION

The present invention relates to an improved power regulation system or power conversion system. Although the power converter disclosed herein may be conveniently described with reference to a single or multiphase buck converter system, it should be appreciated and understood by one skilled in the art that any basic switching power converter (SPC) or regulator topology may be employed, e.g., buck, boost, buck-boost and flyback.

Figure 1:
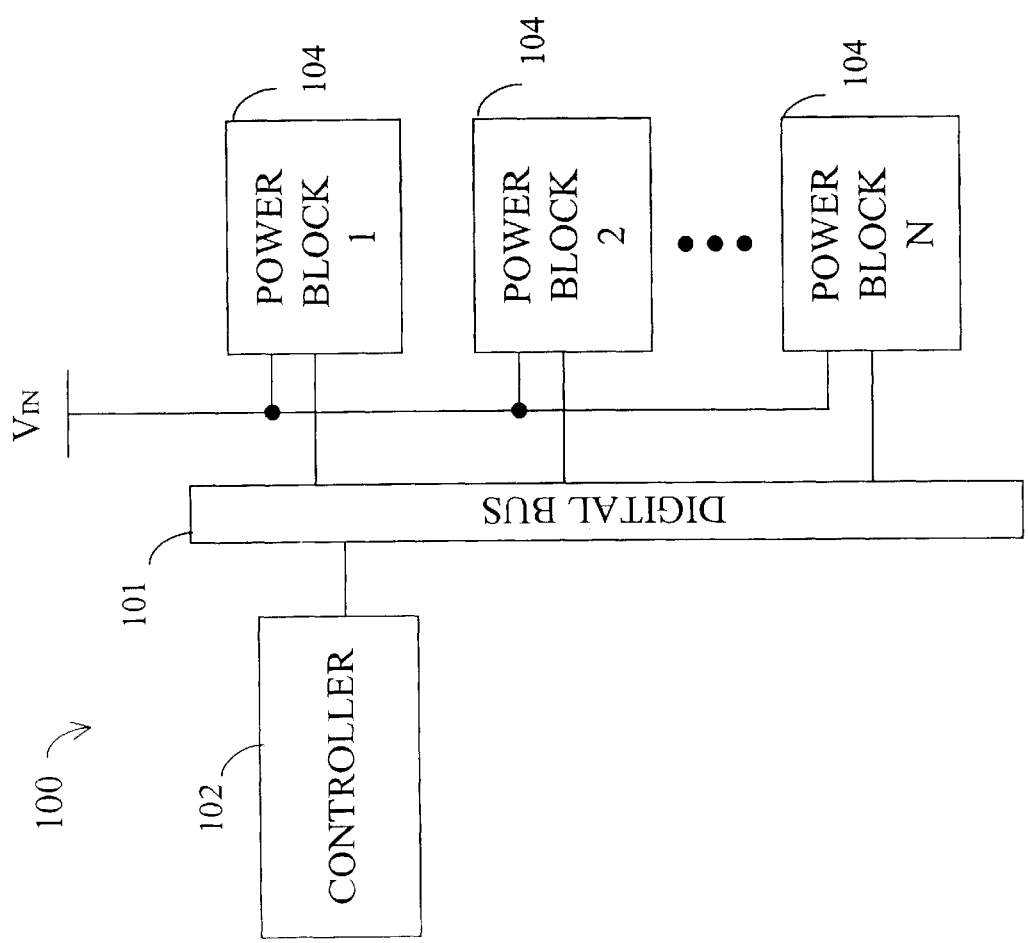
FIGS. 1–3 illustrate, in block format, a power regulation system in accordance with various embodiments of the invention.

FIG. 1 illustrates, in simplified block format, a power regulation system 100 in accordance with one embodiment of the invention. System 100 includes a digital communication bus 101, a controller 102 and a plurality of power blocks 104. System 100 may be implemented in any basic SPC topology. In the preferred embodiment, system 100 receives an input source voltage (VIN) and converts the voltage to a desired number of outputs, with each output at a desired voltage, in a highly efficient and reliable manner.

System 100 is expandable to many phases (i.e., "N" number of phases), allowing many different load levels and voltage conversion ratios. As shown, system 100 includes "N" number of power blocks 104 which may be limited only by the capabilities of the controller. For instance, in one particular embodiment, system 100 is configured to include eight single-phase converters ("blocks" or "channels"). Alternatively, in another embodiment, system 100 is configured to include one eight-phase converter.

Controller 102 receives and sends information to power blocks 104 via digital bus 101, or the equivalent. In general, the information communicated between the controller and the power blocks allows the system to precisely regulate the output voltage for any given load of the power block. In this manner, controller 102 independently controls multiple voltage outputs. This function will be described in further detail in the following description and accompanying Figures.

Figure 2:
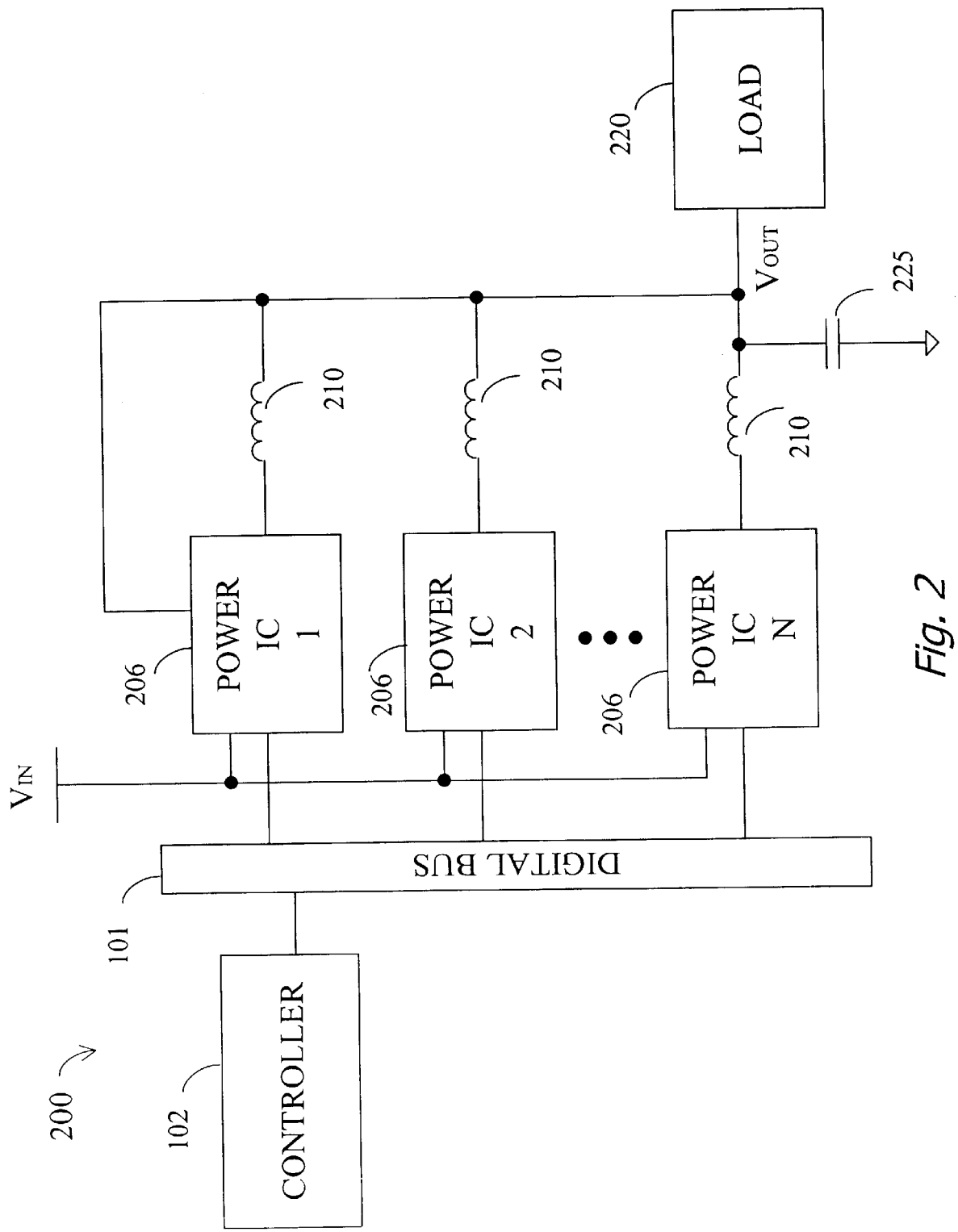

FIG. 2 illustrates, in block format, a power regulation system 200 in accordance with one embodiment of the invention. System 200 includes a digital bus 101, a controller 102, a plurality of power ICs 206, a plurality of output inductors 210, an output filter capacitance 225 and a load 220. System 200 is configured as a multiphase buck converter system; however, as previously mentioned, system 200 may be configured as any basic switching power converter (SPC) topology.

System 200 is suitably configured to output a single voltage (VOUT) to load 220. As such, system 200 may be considered a single output/single load system. Accordingly, the detailed discussion of the present invention begins with a very general topology (i.e., single output/single load); however, it should be recognized that FIG. 2 and the accompanying description is not intended to be limiting, but rather merely exemplary of one embodiment of the present invention. As such, each power IC 206 is configured to provide an output to load 220 in accordance with a predetermined voltage.

Generally, power ICs 206 are configured to alternately couple inductors 210 between the source voltage and a ground potential (not shown) based on control signals generated by controller 102. During transient load events, any number of output inductors 210 may be coupled simultaneously to either the voltage source or ground potential as needed by the load(s). In addition, the inductance of inductor 210 can vary depending upon input and output requirements. Capacitance 225 provides DC filtering of inductor currents and further acts as a charge well during load transient events.

During normal operation, each power IC 206 is preferably equally phased in time to minimize output ripple voltage to the load. Power ICs 206 share digital information between them and/or the controller such that each phase shares an equal part of the respective load current. Although each power IC 206 is illustrated as a stand-alone phase, each power IC may be implemented as any suitable number of distinct phases. The structural and functional aspects of power IC 206 are described in more detail below in FIG. 4.

Information relating to input/output characteristics of the power regulation system may be transmitted from various system elements to controller 102 in a suitable feedback loop. For example, controller 102 preferably receives digital information regarding mode of operation, output voltage, and output current from each power IC 206. In turn, controller 102 sends switch state information, such as pulse width and frequency information, to each power IC 206 to, for example, compensate for the demands of the load, the voltage source, and any environmental changes in order to maintain a constant voltage to the load. In this sense, controller 102 may include a digital signal processor (DSP), a microprocessor or any suitable processing means.

Preferably, controller 102 includes one or more algorithms to facilitate control of the system. As previously mentioned, power ICs 206 are suitably configured to transmit input/output information to controller 102 and the algorithms are suitably adaptive to the received information. In other words, controller 102 may modify the control algorithms in response to the received information. Since the control function may be stored in an algorithm, software code, or the like, modes of operation can be changed continuously during the operation of the system as needed, e.g., to obtain a higher transient response. In this manner, controller 102 may be programmed with recovery algorithms to effectively respond to sensed transient conditions at the regulated output. For example, in ATRH (active transient response high) and ATRL (active transient response low) modes, the controller includes instruction to align the high side or low side FETs on. This action provides a brief period of high di/dt through the power stage in order to respond to high di/dt load demands (e.g., a microprocessor load). Each power IC 206 is suitably configured to operate in any suitable control mode such as, Pulse Width Modulation (PWM), constant ON time variable frequency, constant ON or OFF time and variable frequency, simultaneous phases ON, and simultaneous phases OFF. In one particular embodiment, controller 102 includes one or more algorithms for providing predictive control of the particular system. For example, a suitable algorithm may be programmed to recognize signs or receive signals indicating a high load, current, or similar situation. The controller may then be able to set the power regulation system to an operational mode best suited for the anticipated condition.

In one embodiment of the present invention, a current sharing feature of the power ICs is included. In general, the power ICs may receive substantially equally power from the voltage source or a varied voltage may be supplied to each. A current feedback from each power IC to the controller (not shown) may be included forming a synchronized share line to facilitate balancing the currents between the blocks or power ICs.

Figure 3:
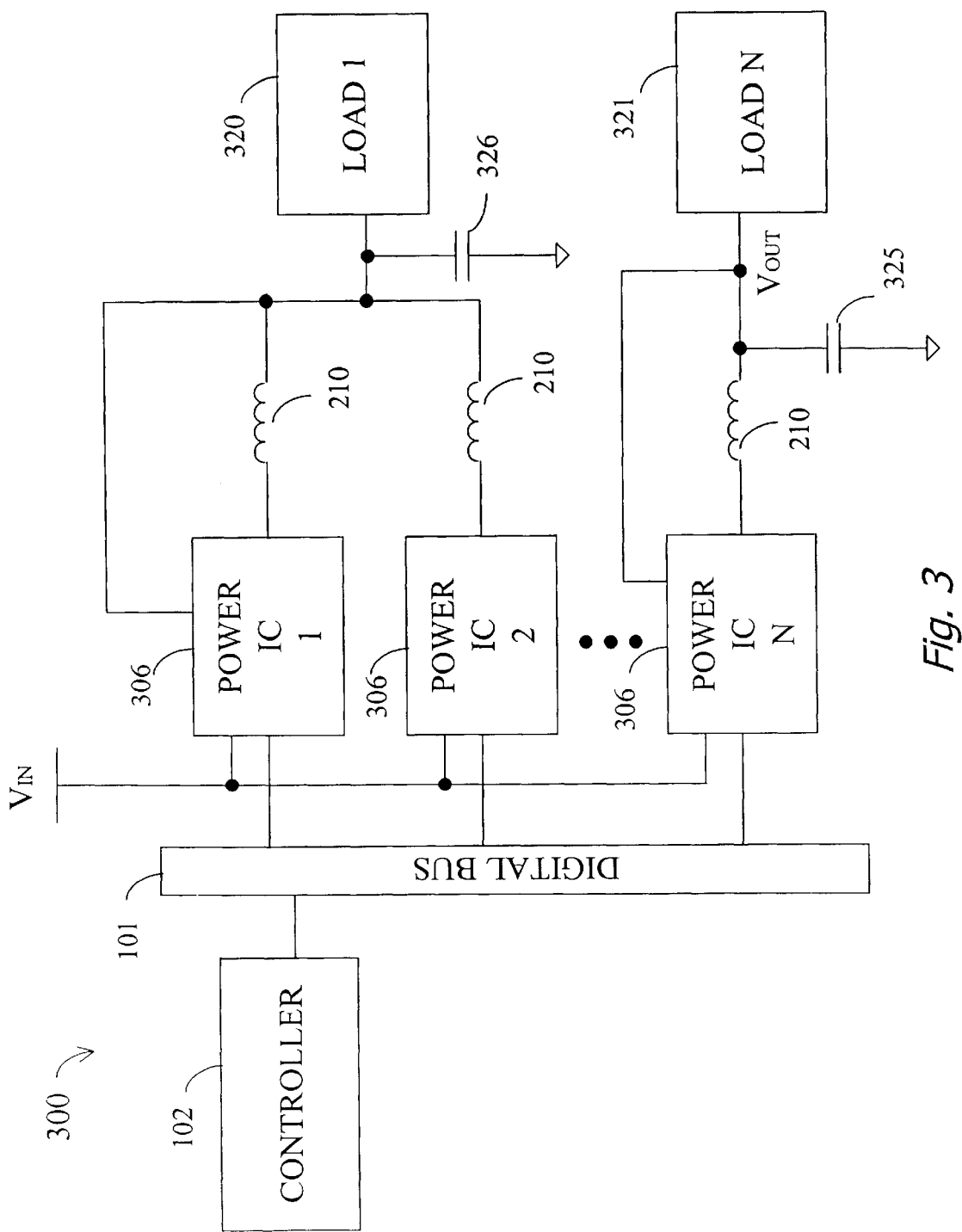

FIG. 3 illustrates, in block format, a power regulation system 300 in accordance with another embodiment of the invention. System 300 includes substantially the same system elements as system 200 (i.e., digital bus 101 and controller 102) except that system 300 includes a plurality of power ICs 306 and multiple loads 320–321. The operation of system 300 is substantially the same as previously described for systems 100 and 200 and thus will not repeated. In contrast, system 300 represents a multi-output/multi-load power regulation system. For example, power ICs 306 (labeled POWER IC 1 and POWER IC 2) are coupled to a single load 320 (labeled LOAD 1) and an output filter capacitance 326, and power IC 306 (labeled POWER IC N) is coupled to a second load 321 (labeled LOAD N) and an output filter capacitance 325. In this sense, load 320 receives a voltage input which is a combined voltage from two power ICs (VOUT 1). Controller 102 independently manages the operation of voltage input to multiple loads. It should be appreciated that any number of power ICs may be coupled together to provide regulated voltage to one or more loads. For example, load 320 is shown receiving inputs from two power ICs, however this is not intended to be limited in any way.

Figure 4:
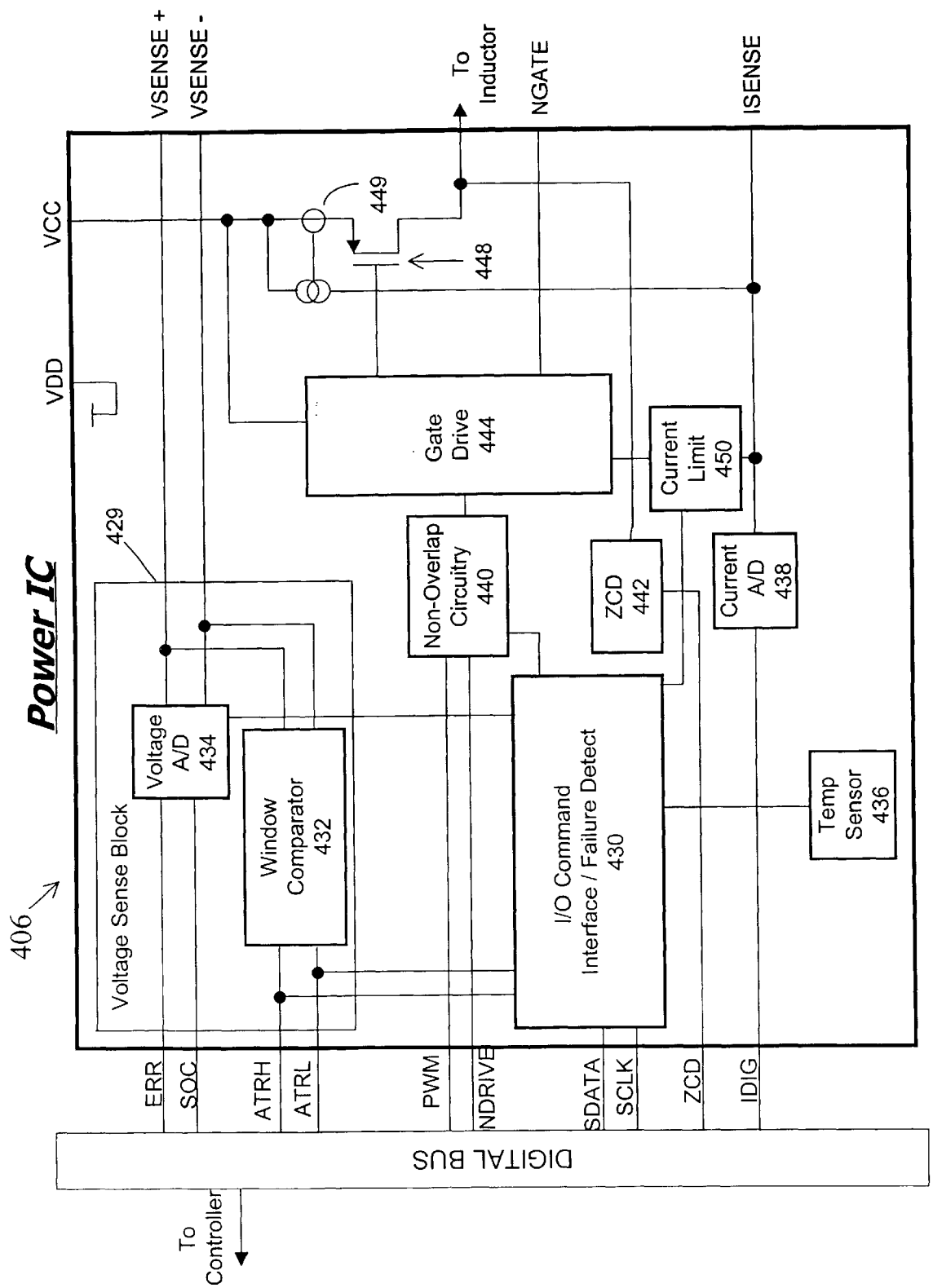
FIG. 4 illustrates, in block format, an exemplary power IC for use in a power regulation system of the present invention.

FIG. 4 illustrates, in block format, a power IC 406 in accordance with one embodiment of the present invention. Power IC 406 may be suitably implemented in a power regulation system of the present invention such as power IC 206,306, and is merely exemplary of one preferred embodiment. The general function of power IC 406 has been described previously for power ICs 206 and 306 and thus will not repeated entirely again; however, the functions of the major individual components comprising power IC 406 will be described below.

Power IC 406, in general, includes an integrated circuit (IC) having multiple pins for facilitating suitable connections to and from the IC. For example, power IC 406 may include an integrated, P-channel high side switch 448 and driver 444 as well as a low side gate driver 444. When used in conjunction with external N-FETs and an output inductor (e.g., inductor 210), power IC 406 forms a buck power stage. Power IC 406 is optimized for low voltage power conversion (e.g., 12 volts to approximately 1.8 volts and less) which is typically used in VRM ( voltage regulator module) applications. The present embodiment of power IC 406 has particular usefulness in microprocessor power applications. Power IC 406 includes a voltage sense block 429, a command interface 430, a current A/D 438, a non-overlap circuit 440, a gate drive 444, a switching element 448, and a current limiter 450. Additionally, power IC 406 may include a current sense 449, a zero current detector 442, and/or internal protection features, such as a thermal sensor 436 and various other features which will be discussed below.

While controller 102 may be considered the "system controller" which effectively operates and manages each power IC within the system, as well as the system itself, command interface 430 includes circuitry and the like to function as a "power IC controller." In other words, command interface 430 may include a portion of the controlling functions of controller 102 as "on-chip" features.

Command interface 430 provides a suitable interface for routing signals to and from power IC 406. For most of the components of power IC 406, information from the individual component is routed to the controller through command interface 430. The information provided to the controller may include fault detection of a component or system, component or system updates, and any other pertinent information which may be used by the controller. Preferably, power IC 406 includes a fault register within command interface 430 which is polled by the controller. Command interface 430 also receives information from the controller which is distributed to the individual components of power IC 406 as needed.

In general, command interface 430 includes a serial bus interface. The serial bus is preferably of the type to write data into and may be programmed by the system user. For example, each power IC may be set at a predetermined voltage output level as needed for the corresponding load. In addition, the user may set an absolute window for the output voltage. The predetermined set information may then be used by command interface 430 to send "commands" or set levels to various other components of the power IC. For instance, the predetermined output voltage level (or an equivalent simulation) may be provided from command interface 430 to voltage sense block 429 for configuring comparison levels (the functions of voltage sense block and its components will be described in more detail below). Command interface 430 may also provide information to set "trip points" for current limiter 450 and optional temperature sensor 436. Various other system components may also receive commands, information, set levels and so forth, from command interface 430.

The power regulation system of the present invention utilizes various feedback loops to regulate the output voltage and manage current within the power converter. For instance, voltage sense block 429 is suitably configured to form a transient feedback loop. In particular, voltage sense leads from the load furnish the feedback loop with the input voltage supplied to the load. The components within the feedback loop or voltage sense block 429, perform comparisons and the like between the sensed voltage and a desired "set" voltage which is reported to command interface 430 and/or the controller. Voltage sense block 429 generally includes a voltage A/D 424 and a window comparator 432. In general, voltage A/D 424 communicates to the controller a digital difference between the set voltage and the input voltage and window comparator 432 communicates to the controller whether the input voltage is varied (too high or too low) from the set voltage.

Voltage A/D 434 may comprise a variety of electrical components coupled together to cause a voltage analog-to-digital (A/D) configuration as is commonly known in the industry. Voltage A/D 434 receives a constant reference voltage (not shown), a sample, or the equivalent, of the input voltage supplied to the load (via sense leads from the load), and the predetermined "set" voltage or desired output voltage from command interface 430. The voltage A/D 434 is configured to compare the load voltage with the set voltage and generate a digital representation of the absolute difference (i.e., positive or negative), if any, between the two voltages. The difference is then transmitted to the controller via digital bus 101. As shown, the transmission to the controller is a direct line, or pin connection; however, the transmission may be suitably routed through the command interface if needed. The controller determines if the input voltage to the load is within an acceptable range and if not, may transmit a command to the power IC (e.g., to command interface 430) to adjust the set voltage. Although not illustrated, it should be appreciated that sensed voltage from the load may be represented as a positive and a negative sensed voltage. In addition, the sensed voltage may be filtered prior to receipt at the power IC.

Window comparator 432 preferably comprises a high speed, low offset comparator configuration commonly available in the electrical industry. Window comparator 432 also receives the sensed voltage from the load in a similar manner as just described for voltage A/D 434 and receives the set voltage from voltage A/D 434 or, alternatively, from command interface 430 directly. Window comparator 432 suitably compares the two received voltages and transmits a signal ATRH (active transient response high) to the controller indicating a "high" or "low" sensed voltage. For example, if the sensed or load voltage is lower than the set voltage, window comparator 432 may transmit an ATRH to the controller and in a like manner, if the sensed voltage is higher than the set voltage, window comparator 432 may transmit an ATRL (active transient response low) to the controller. As previously mentioned, the set voltage may include an absolute window which may or may not be considered by the window comparator depending on the desired precision of the particular application. The controller is suitably able to receive the flash signals from window comparator 432 and either alone or in combination with the digital voltage and current information received, the controller may adjust the load voltage, set voltage, or other system components as needed to coordinate precise control of the output voltage.

Current A/D 438 may comprise a variety of electrical components coupled together to cause a current analog-to-digital (A/D) configuration as is commonly known in the industry. Current A/D 438 receives a very small fraction (e.g., 1/10,000) of the source voltage (VIN) and samples the voltage at the peak. Current A/D 438 converts the sampled voltage to digital format and transmits the data to the controller. The controller can determine the level of current in the sampled channel to preferably maintain current equilibrium between the two channels.

Current limiter 450 essentially comprises another comparator block having electrical components coupled together to cause a comparing structure and function. In general, current limiter 450 also receives a small fraction of the current from the source and compares the current levels between the source voltage and a reference.

At a threshold level (which may include a set percentage of the peak channel current), current limiter 450 sends a signal to mode gating logic 444 which effectively turns a "high side" driver off. The current information is passed to the controller digitally via command interface 430. The controller may assess whether all or just a few channels were in current limit across a given fault polling cycle. Isolated, single channel current limit events may be ignored, but if the current limit is detected for a number of consecutive fault polling cycles, the controller may cease PWM to that channel and re-phase the system. If the controller detects that all or substantially all of the power ICs within the system are in current limit, then the system may be sent to the OFF state.

Gate drive 444 comprises system level logic to drive power IC 406 either high or low. For example, a pair of driver amplifiers or any suitable gain devices may be included.

Switching element 448 receives a signal from gate drive 444 which couples the output inductor to the input source or ground. In this sense, switching element 448 may include any suitable electrical device capable of performing a switching function such as, a bipolar transistor (BJT), field effect transistor (FET), metal oxide semiconductor (MOS, either N or P) and the like.

Non-overlap circuitry 440 prevents the high and low side drivers of mode gating logic 444 from conducting current simultaneously and may include logic gates and/or voltage comparators. Although not illustrated, it should be appreciated that non-overlap circuitry 440 may receive a high side signal (e.g., PWM) and a low side signal which may be utilized to implement various modes of operation. As previously mentioned, the system is uniquely versatile in that it can be operated in virtually any control mode of operation desired. Each mode of operation has advantages for control of the output voltage depending on the respective load demands. For example, in one embodiment a power regulation system of the present invention may be operated in continuous conduction mode (CCM) with external synchronous power FETs in continuous conduction regardless of the load current. In other words, negative current may be allowed to flow in the main inductor during light loads. In this embodiment, the standard PWM control may be performed via an input to non-overlap circuitry 440. In another embodiment, the system may be operated in discontinuous conduction mode (DCM) with the external synchronous power FETs turned off when the current reaches zero. In other words, a negative current may not be allowed to flow in the main inductor during light loads. The controller controls the OFF time of the low side switch in response to the ZDC signal.

In one embodiment, a power regulation system of the present invention includes a current sense mechanism 449. Current sense 449 detects the level of current by mirroring the level to an op amp. Identifying the input current levels can provide additional fault protection, help to monitor the power regulation, and other advantages to the system which may be best understood by referencing U.S. patent application Ser. No. 09/978,296, filed on Oct. 15, 2001 and entitled "System and Method for Current Sensing." The contents of which are incorporated herein by reference.

In another embodiment, a power regulation system of the present invention includes a zero current detect circuit (ZCD) 442. ZCD 442 detects when switching element 448 is low or effectively is switched to ground. In this sense, when a substantially zero current is detected, the operation of the system may be changed such that inefficiencies (e.g., due to high RMS currents) are minimized. ZCD 442 may transmit notification of the zero current state directly to the controller via digital bus 101 or, alternatively, may supply the notice to command interface 430 for reporting to the controller. The detailed operation, structure and function of a suitable zero current detect may be best understood by referencing U.S. patent application Ser. No. 09/978,296, filed on Oct. 15, 2001 and entitled "System And Method For Detection Of Zero Current Condition," the contents of which are incorporated herein by reference.

In yet another embodiment, a power regulation system of the present invention includes one or more internal protection features. In one particular embodiment, power IC 406 includes a temperature sensor 436. Temperature sensor 436 may be, but is not limited to, an integrated solid state current modulating sensor or a thermistor. Temperature sensor 436 monitors the temperature of power IC 406 and periodically reports temperature readings to command interface 430. As previously discussed, command interface 430 preferably sets the temperature trip levels, high and low boundaries, and determines if the reading received from sensor 436 is outside the boundaries. If the temperature of the IC is above or below the predetermined "safety" temperatures (generally determined as levels just above or below a temperature which may cause damage to electrical circuitry, functioning, and the like, e.g., approximately 145° C. to 205° C.), then command interface 430 notifies the controller and in some situations, the controller may cease PWM to that channel and re-phase the system.

In another particular embodiment, another internal protection feature in power IC 406 is an under-voltage/over-voltage (UV/OV) protection mechanism (not shown). An input voltage protection comparator may be present in each power IC to protect the system from operating outside normal thermal and stability boundaries. The comparator senses the voltage across an input capacitor (not shown) to the VRM and if the input voltage lies outside a trigger level, the controller may pause the system.

In still another embodiment, an output UV/OV protection may be included (not shown) in a power regulation system of the present invention. One of the power ICs in the system may be assigned to UV/OV protection and suitably include a comparator for this purpose. The comparator senses the output voltage to ensure the voltage is within the safe operating range of the receiving load. The controller detects the condition through the command interface 430 and may transmit an OFF state to the system.

In still another embodiment, a power regulation system of the present invention includes a soft start mechanism to regulate the power-on voltage rise of the load. At the time of power-on, the system charges rapidly from its rest state to on-state so that it may provide the required load current at the set voltage level. A soft start mechanism provides yet another internal protection feature which prevents false failures and/or damage during initial power-on.

With combined reference to the previous Figures, controller 102 coordinates identification (ID) and phase assignment of the power ICs in the system. The controller may use PWM inputs and ZDC outputs to coordinate the ID assignment sequence. The controller tracks the number of power ICs available in the system by setting an internal time limit (e.g., 1 ms) for all power ICs to issue a ZCD high following a power-on reset. Active high on the ZCD pin indicates that the power IC is ready to receive an address and be counted in the system. The controller responds by setting the power IC in an "ID acquire" mode and pulls the PWM input to the power IC high. The ID is sent to the power IC and verified through the command interface. Following receipt of a valid ID, PWM is asserted low and the power IC is ready for active operation. The power ICs may be assigned IDs with or without VCC present, but in the latter case, an under-voltage fault may be registered. Preferably, the controller will not assert PWM signals to the systems until the power ICs are counted and assigned IDs, and the fault registers within the system have been checked.

In addition, controller 102 preferably manages the removal of damaged power ICs and the re-phasing of operational power ICs during a fault. In this manner, controller 102 recognizes the fault and makes the decision to remove an individual power IC from the system or, alternatively, shut down the system.

The controller 102 supports power IC identification to make the system scalable and addressing enables channel dropping and re-phasing for certain failure modes. In one particular embodiment, the address of each power IC in the system is suitably communicated through command interface 430. The controller uses the available number to determine the relative phase relationship between the power IC channels.

It should be appreciated that while not illustrated on FIG. 4, various other components may be suitably included and recognized by those of skill in the art as common structures of an electrical device. For example, a clean clock may be received at command interface 430, a start-of-conversion signal may be received at voltage A/D 434 to initiate the A/D, and a clock, generated by, for example, an off-chip crystal oscillator, may be received at a pin on the chip as is common in electrical chip configurations.

Figure 5:
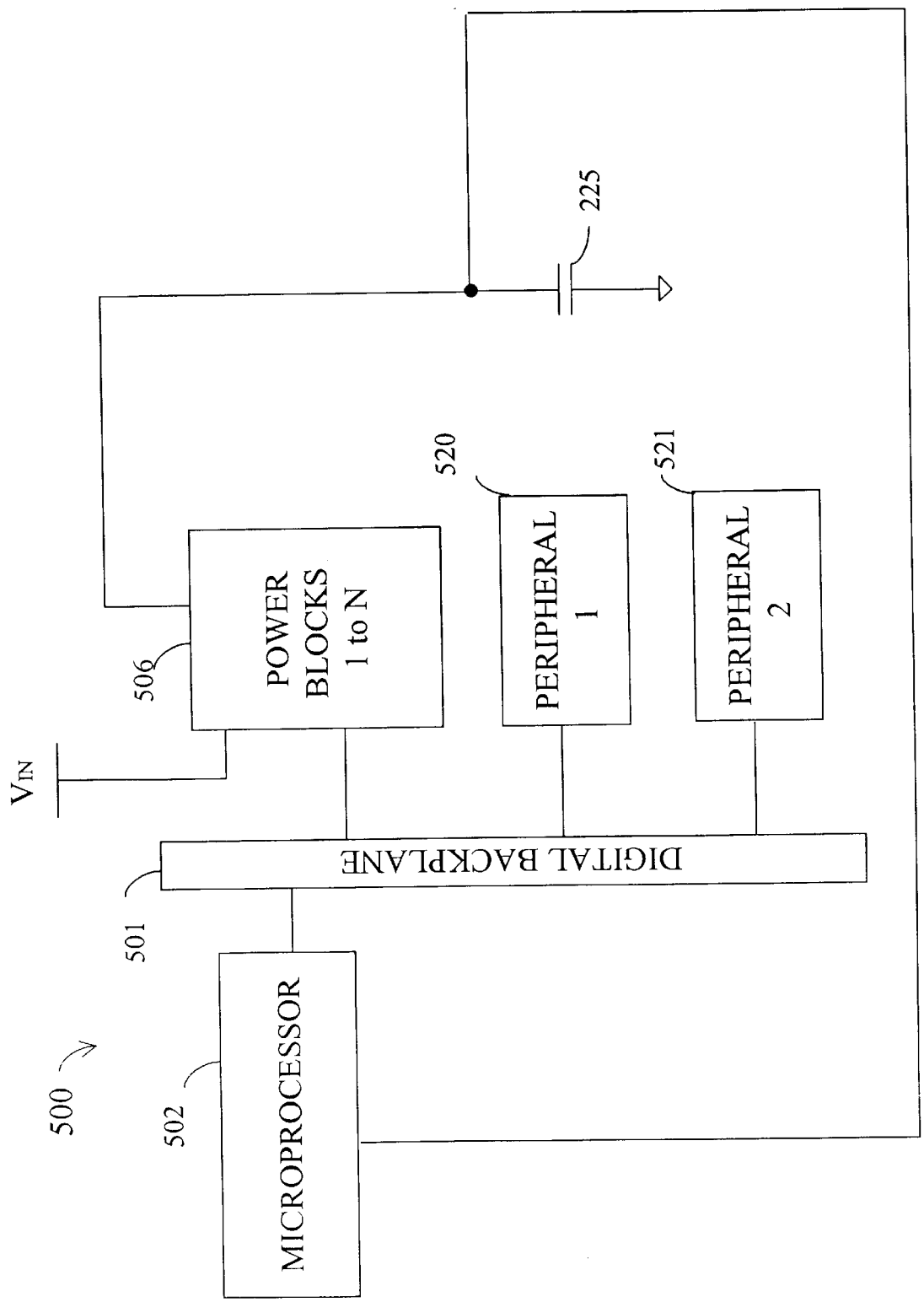
FIG. 5 illustrates, in block format, a power regulation system in accordance with yet another embodiment of the invention.

FIG. 5 illustrates, in block format, a power regulation system 500 in accordance with yet another embodiment of the present invention. System 500 includes a backplane 501, a microprocessor 502, a plurality of power blocks 506, an output filter capacitance 225, and a plurality of peripherals 520, 521. The present embodiment of the invention (as well as various other embodiments) is configured to adapt to multi-modes of operation, which advantageously permits the system to optimize the mode of operation to suit the demands of the individual load(s). The present invention may be particularly suited to power high-current low-voltage loads, such as microprocessors, and thus the present embodiment may be conveniently described in that context. It should be appreciated that this is only one particular embodiment and is not intended to be limiting on the scope of the invention. Moreover, the previously described embodiments may suitably include some or all of the following elements, in particular, the previous embodiments may include a microprocessor load.

Backplane 501 is preferably a multifunctional digital backplane such as an optical backplane or the like, that facilitates data transmission between microprocessor 502, power blocks 506 and peripheral devices 520, 521. For example, voltage regulation control algorithms may be transferred from microprocessor 502 to any or all of the power ICs within each power block 506 via backplane 501. Power is transferred through power blocks 506 to microprocessor 502 and peripherals 520, 521.

Microprocessor 502 may be similar to controller 102, however, this particular embodiment is especially suited for a microprocessor controller. For example, the microprocessor may be itself a load of the system and thus provide feedback on its own operation. In this manner, the microprocessor receives input from various other system components, such as the power ICs, peripherals, other loads, as well as data relating to its own processes. A suitable algorithm within the microprocessor may be programmed to compile, sort and compute the received data to determine the "state" of the overall system. For example, during pre-periods of high load, high current, or various other situations, the microprocessor could suitably anticipate and predict the forthcoming situation by analyzing the "warning" signals or precursor data. In this sense, the microprocessor can set the power regulation system into a predictive control mode as needed.

Power blocks 506 are similar in structure and function as previously described power blocks 104, power ICs 206, 306 and 406. Of course, in this particular embodiment, the power ICs may send and receive data via backplane 501 and/or digital bus 101.

Peripherals 520, 521 may be internal or external interfaces to electrical equipment coupled to the power regulation system. For example, interfaces to monitors, printers, speakers, networks and other equipment may be coupled to the system via backplane 501.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to exemplary embodiments. However, those skilled in the art having read this disclosure will recognize that changes and modifications may be made to the embodiments without departing from the scope of the present invention. For instance, the present invention has been described with a single controller to manage/control the power regulation to one or more loads; it should be recognized, however, that more than one controller may used to manage/control multiple loads within the system depending upon the particular requirements and limitations of the system. These and other changes or modifications are intended to be included within the scope of the present invention, as expressed in the following claims.

What is claimed is:

1. A power regulation system coupled to an input source voltage (Vin) and an output voltage (Vout), said Vout electrically coupled to a load, the system comprising:

a plurality of power conversion blocks in a multi-phase configuration, each block electrically coupled to said Vin at a power IC and coupled to said Vout at an output inductance, said power IC including a command interface having read/write capabilities for storing data;

a controller in communication with and providing an instruction to said power conversion blocks, said controller having a plurality of adaptive algorithms configured to receive power conversion data from said blocks and to determine said instruction based on said power conversion data, said controller determining said multi-phase configuration and capable of re-phasing said blocks in response to said power conversion data; and a digital bus providing a communication channel between said plurality of power conversion blocks and said controller.

2. The power regulation system of claim 1, wherein said controller comprises one of a digital signal processor (DSP) or a microprocessor.

3. The power regulation system of claim 1, further comprising a current feedback line between each of said power conversion blocks and said controller to facilitate current balancing.

4. The power regulation system of claim 1, wherein said command interface of said power IC further comprises a fault register.

5. The power regulation system of claim 4, wherein said controller periodically polls said fault register via said digital bus to determine if a fault within said power IC has occurred.

6. The power regulation system of claim 1, wherein each of said power ICs comprises an identification (ID) as assigned by said controller.

7. The power regulation system of claim 1, wherein said controller comprises a predictive control algorithm.

8. The power regulation system of claim 1, wherein said power conversion data comprises prediction control data and said controller provides said instruction in anticipation of a predicted condition.

9. The power regulation system of claim 1, wherein said power conversion data and said instruction comprise a mode of operation.

10. The power regulation system of claim 9, wherein said mode of operation includes one of pulse width modulation, constant ON time variable frequency, constant ON or OFF time and variable frequency, simultaneous phases ON, simultaneous phases OFF, active transient response high, active transient response low, continuous conduction or discontinuous conduction.

11. The power regulation system of claim 10, further comprising a multi-mode system wherein said controller provides a change of mode of operation instruction to said power block.

12. A method of controlling a multi-phased power regulation system, said method comprising the steps of:

receiving, at a controller, a plurality of digital information from each of a plurality of power conversion blocks in a multi-phase configuration, said information relating to an operation of said power conversion block;

analyzing said received information to include prediction of anticipated conditions;

transmitting a plurality of control information from said controller to each of said power conversion blocks in response to said analyzing step;

re-phasing said power conversion blocks in response to said analyzing step; and changing to a different mode of operation of said power conversion blocks in response to said analyzing step.

13. The method of claim 12 further comprising the step of periodically polling a fault register of each of said power conversion blocks to receive fault information.

14. The method of claim 13 further comprising the steps of:

analyzing said fault information;

removing a faulty power conversion block from said multi-phase configuration; and re-phasing the remaining power conversion blocks.

15. The method of claim 12 wherein said controller comprises a microprocessor and said receiving step occurs at said microprocessor.

16. The method of claim 12 further comprising the step of forming a synchronized current share line between said controller and each of said power conversion blocks.

17. The method of claim 12 further comprising the step of addressing each of said power conversion blocks.

18. The method of claim 17 further comprising the step of determining a number of available power conversion blocks in response to said addressing step.

19. The method of claim 18 further comprising the step of determining a relative phase relationship between a plurality of channels in response to said addressing step.

20. The method of claim 12 wherein said changing step comprises changing to one of pulse width modulation, constant ON time variable frequency, constant ON or OFF time and variable frequency, simultaneous phase ON, simultaneous phase OFF, active transient response high, active transient response low, continuous conduction, or discontinuous conduction.

21. The method of claim 12 wherein said changing step comprises changing to an active transient response mode and said controller instructs a plurality of FETs within said power conversion block to remain ON.

22. A multi operational mode power converter comprising:

a plurality of power ICs, each of said power ICs receiving a voltage input (Vin) and outputting a converted voltage (Vout);

a microprocessor in electrical communication with said plurality of power ICs, said microprocessor receiving said Vout from at least one of said power ICs and receiving a plurality of digital data from each of said power ICs, said microprocessor providing a control instruction to said power ICs in response to said received digital data, said control instruction comprising a mode of operation; and a digital communication channel coupled to said microprocessor and said plurality of power ICs for transmission of said digital data and said control instruction.

23. The power converter of claim 22, wherein said digital communication channel comprises a digital backplane.

24. The power converter of claim 22, wherein said digital communication channel comprises an optical backplane.

25. The power converter of claim 22, further comprising a plurality of control algorithms stored on said microprocessor.

26. The power converter of claim 22, wherein said digital data comprises anticipatory operational information and said control instruction comprises a predictive control mode of operation.

* * * * *